United States Patent

Forster et al.

[11] Patent Number: 6,090,307
[45] Date of Patent: *Jul. 18, 2000

[54] PHASE-STABLE POLYOL COMPONENT

[75] Inventors: Heinz Forster, Wolfratshausen; Hans-Juergen Reese, Olching, both of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/859,993

[22] Filed: May 21, 1997

[30] Foreign Application Priority Data

Jun. 4, 1996 [DE] Germany ............... 196 22 333

[51] Int. Cl.[7] ............................................. C09K 3/00
[52] U.S. Cl. .............................................. 252/182.24
[58] Field of Search ..................................... 252/182.24

[56] References Cited

U.S. PATENT DOCUMENTS 3,732,265  5/1973  Roth et al. .
4,234,696  11/1980 Birum et al. .
4,383,050  5/1983  Nissen et al. .
4,760,099  7/1988  Canaday et al. .
4,940,632  7/1990  Nicola et al. .

FOREIGN PATENT DOCUMENTS

3323880 C1  7/1983  Germany .
40 25 843   8/1990  Germany .

Primary Examiner—John M. Cooney, Jr.
Attorney, Agent, or Firm—Fernando A. Borrego

[57] ABSTRACT

A phase-stable polyol component comprises
A1) at least one polyether polyalcohol and/or polyether ester polyalcohol,
A2) at least one polyester polyol and
A3) at least one liquid flame retardant additive,
where the constituents A1:A2:A3 are present in a weight ratio of $10\pm4.5:13\pm4:14\pm4.5$.

16 Claims, No Drawings

PHASE-STABLE POLYOL COMPONENT

The invention relates to a phase-stable polyol componet which can be used for producing cellular or compact polyurethanes.

One-component polyurethane foams from aerosol cans, hereinafter referred to as aerosol foams, are frequently used in the building industry for installing windows and doors or as fillers for hollow spaces resulting from the method of construction. The aerosol cans usually contain an NCO-terminated prepolymer plus blowing agents and additives. Discharge of the contents of the can by means of blowing agents, foaming and curing of the foam by means of atmospheric moisture gives the desired foam.

The prepolymer used here can be prepared either within or outside the aerosol can. After formation of the prepolymer or its introduction into the can, the aerosol can is closed, charged with blowing agent and then possibly shaken in order to effect intensive mixing of the contents of the can.

To achieve optimum distribution of the foam in the joints or hollow spaces to be filled with foam, a low viscosity of the pre-polymers is desirable. In the past, the chlorofluorocarbons customarily used as blowing agents contributed to a lowering of the viscosity. Since continued use of these compounds is not possible for environmental reasons, plasticizers or solvents have frequently been added to the prepolymer as described, for example, in DE-A-4 025 843 or EP-A-480 343. However, the use of such compounds leads, since they are not incorporated into the foam, to high shrinkage of the foams.

Owing to the viscosity problems indicated, it has not been customary hitherto to use polyester alcohols as polyol components for aerosol foams. However, it would be desirable for a number of reasons. On the one hand, high proportions of aromatic structures can easily be built into polyester alcohols, for example by use of phthalic acid and/or terephthalic acid as acid component, and the flame resistance of the foams can thus be decisively improved. Furthermore, recycled polyester alcohols which are prepared from polyalkylene terephthalate waste, for example from beverage bottles or from the synthetic fiber industry, and have a high aromatic content age available. The preparation of these recycled polyols is carried out by reacting the polyalkylene terephthalates with lower polyhydric alcohols, for example ethylene glycol, and dicarboxylic acids.

It is an object of the invention to incorporate recycled polyols from polyalkylene terephthalates into polyol components without demixing occurring in the polyol component and such that further processing to give polyurethanes, in particular polyurethane aerosol foams, is possible.

We have found that this object is achieved by a phase-stable polyol component comprising
A1) at least one polyether polyol and/or polyester polyol,
A2) at least one polyester polyol and
A3) at least one liquid flame retardant additive,
where the constituents A1:A2:A3 are present in a weight ratio of 10±4.5:13±4:14±4.5.

The present invention accordingly provides said phase-stable polyol component, provides for its use for producing polyurethanes and also provides the polyurethanes thus produced.

The component A1 has a mean molecular weight of at least 500 g/mol, in particular at least 600 g/mol. It comprises from 5 to 95% by weight, based on A1, of at least one alkoxylated fatty acid ester. Preference is here given to using, for example, alkoxylated castor oil whose mean molecular weight should be at least 1100 g/mol. A further advantageous class of compounds A1 are alkoxylated glycerol-fatty acid esters, in particular mixtures of glycerol esters of dimeric fatty acids having contents of monomeric fatty acids and trimeric fatty acids and up to 20% of free glycerol. These are usually esterification products of glycerol and dimeric fatty acids containing monomeric fatty acids and trimeric fatty acids as industrial impurities. The alkylene oxide used is preferably the ethylene oxide. The ether modification makes the natural materials hydrophilic and thus improves the curing behavior of the foam; on the other hand the structural properties of the natural materials are largely supplanted, which has a very positive effect on the mechanical properties of the foams.

Preference is given to using mixtures of ethoxylated glycerol-fatty acid esters having a mean molecular weight of 1000–3800 g/mol and ethoxylated castor oil having a mean molecular weight of at least 1100 g/mol, preferably in the range from 1300 to 4000 g/mol.

Higher molecular weights of the alkoxylated fatty acid esters can lead to too great an increase in the viscosity and thus to problems in foaming.

As a further constituent of the mixture, use is made of the polyether polyols customarily employed in polyurethane production, as described, for example, in Kunststoffhandbuch, Volume 7 "Polyurethan", edited by G ünter Oertel, 3rd Edition, Carl-Hanser Verlag, Munich, 1993, pages 58–67.

As component A2, use can b made of the known polyester polyols customary in polyurethane chemistry, as are described, for example in Kunststoffhandbuch loc cit., pp. 67–74. However, particularly suitable polyester polyols are reaction products of polyalkylene terephthalate waste with a dicarboxylic acid or a dicarboxylic acid mixture and a diglycol.

Polyalkylene terephthalates are materials used for many applications. An important field of use for polyalkylene terephthalate, in particular polyethylene terephthalate (PET), is the production of beverage bottles. After use, the bottles are collected and broken up. This waste can be converted into polyester polyols by transesterification.

Another possible way of preparing polyols from recycled polyalkylene terephthalate is the reprocessing of waste from polyethylene terephthalate fiber production by oligomerization of the fiber waste by heating for a number of hours in short-chain glycols, in particular diethylene glycol.

These polyols usually have hydroxyl numbers of about 70 mg KOH/g, acid numbers of about 0.5 mg KOH/g and viscosities of about 40,000 mPa.s at 25° C.

Their main advantage is their high aromatic content. Customary, aromatics-containing polyesterols prepared by esterification of aromatic carboxylic acids are difficult to prepare because of their long batch times.

As component A3 of the polyol components of the present invention, use is made of liquid flame retardant additives, in particular phosphorus-containing organic compounds, preferably alkyl phosphates and/or alkyl phosphonates. Owing to their excellent effectiveness, particular preference is given to halogenated, in particular chlorinated, alkyl phosphates and/or alkyl phosphonates as are described, for example in Kunststoffhandbuch, Volume 7, Polyurethane, 3rd Edition, 1993, Carl-Hanser-Verlag, Munich.

Surprisingly, the polyol component of the present invention is completely phase-stable. No demixing occurs even after prolonged storage. Owing to its low viscosity, it can be very readily processed into polyurethanes. The polyurethanes produced using the polyol component display a very good flame resistance owing to the high aromatic content in combination with the phosphorus-containing flame retardants. The use of halogen-containing polyol-type flame retardants can be reduced or avoided completely.

For the further processing to give polyurethanes, the polyol component of the present invention can be mixed with the constituents and additives which are customarily present in the polyol component of a polyurethane system without the phase stability being impaired.

Constituents of the mixture which may be mentioned here are short-chain diols as chain extenders, short-chain trifunctional or higher-functional alcohols as crosslinkers, catalysts, blowing agents, stabilizers, dyes and monools which control the molecular weight during the prepolymer synthesis.

Suitable polyurethane catalysts are strongly basic amines or organic metal compounds, preferably tin compounds or synergistically acting combinations of strongly basic amines and organic tin compounds. Examples which may be mentioned of strongly basic amines are: amides such as 2,3-dimethyl-3,4,5,6-tetrahydropyrimidine, tris(dialkylaminoalkyl)-s-hexahydrotriazines such as tris-(N,N-dimethylaminopropyl)-s-hexahydrotriazine and preferably tertiary amines such as triethylamine, tributylamine, dimethyl-benzylamine, N-methylmorpholine, N-ethylmorpholine, N-cyclohexyl-morpholine, bis(morpholinoethyl) ether, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea, di-methylpiperazine, 1,2-dimethylimidazole, bis(4-N,N-dimethylamino-cyclohexyl)methane, 1-azabicyclo[3.3.0]octane and 1,4-diazabicyclo[2.2.2]octane. Suitable organic tin compounds are, for example: tin(II) salts of organic carboxylic acids, e.g. tin(II) diacetate, tin(II) dioctoate, tin(II) diethylhexanoate and tin(II) dilaurate and the dialkyltin(IV) salts of organic carboxylic acids, e.g. dibutyltin diacetate, dibutyltin dilaurate, dibutyltin maleate, dibutyltin dimercaptide and dioctyltin diacetate.

Suitable stabilizers are siloxane-oxyalkylene copolymers. Suitable blowing agents are liquefied gases and also substances having a low boiling point, for example dimethyl ether, propane, n- or iso-butane, pentane, methyl isobutyl ether and halogenated hydrocarbons such as dichlorofluoromethane, monofluorotrichloro-methane, trifluorotrichloroethane, trifluoromethane, 1,1-dichloro-1-fluoroethane, monochlorotrifluoroethane, monochlorodifluoroethane, difluoroethane, dichlorotrifluoroethane, monochlorotetrafluoroethane, pentafluoroethane, tetrafluoroethane, dichloromonofluoroethane.

The overall mixture thus has the hydrophilic character necessary for use as formative component for a one-component polyurethane-polyurea aerosol foam, is a homogeneous liquid phase incorporating polyesters and polyethers and contains the specific recycled polyol and the modified polyols derived from natural materials in proportions which determine the properties.

If the ratios of the components A1, A2 and A3 are not as defined in the present invention, demixing of the polyol component occurs after only a short time.

Further details regarding the auxiliaries and additives may be found, for example, in the Kunststoffhandbuch, Volume 7, Polyurethane, edited by Gunter Oertel, Carl-Hanser-Verlag, Munich, 3rd edition 1993.

For the further processing to give polyurethanes, the polyol component is reacted with isocyanates.

To produce aerosol foams, the polyol component is preferably reacted with a diphenylmethane diisocyanate and its higher homologs. Particular preference is given to mixtures of MDI containing two aromatic rings and MDI containing more than 2 aromatic rings, known as raw MDI. The polyurethane reaction should be carried out using an excess of isocyanate. The NCO content of the prepolymers is, in particular, 10–15% by weight, preferably 11–13% by weight.

Usually, a polyurethane semiprepolymer is prepared by known methods in an aerosol can from the mixture according to the present invention with addition of a polyisocyanate in stoichiometric excess and in the presence of liquefied gases.

However, another possible method of preparation is the introduction of a semiprepolymer previously made in a closed reactor from the abovementioned constituents into the respective aerosol can and subsequent addition of the liquefied gases.

The usual method of preparation for the polyurethane semiprepolymer in the aerosol can is as follows:

The polyol component is metered into the aerosol cans in the previously calculated amount. The polyisocyanate is added in the previously calculated amount, i.e. in a stoichiometric excess. The aerosol cans then run through a closure apparatus and are closed with a valve. Immediately afterwards, the liquefied gases of the desired type and in the desired amount are metered in through the valve. In the shaking or tumbling unit which follows, the constituents of the mixture present in the aerosol can are intensively mixed and homogenized. The reaction which subsequently occurs produces the polyurethane semiprepolymer in the aerosol cans. After storage for 24 hours at 50° C. or for about 3 days at room temperature, the reaction is sufficiently complete for the polyurethane one-component aerosol foam to be able to be used.

When used, the polyurethane semiprepolymer in the abovedescribed composition is discharged or metered into the desired point of use through the valve, depending on the type of valve, either via a mixing tube or a corresponding application gun. The polyurethane semiprepolymer foams, fixes the component to be installed or fills hollow spaces resulting from the method of construction and is cured by means of atmospheric moisture or the water from the substrate added before installation.

The foam of the type described produced using the polyol component of the present invention has improved properties. Thus, it has an increased strength together with improved extensibility and an improved elasticity compared with similar products. A further advantage of the foam is its low temperature processability. The previously known polyurethane-polyurea one-component foams have the disadvantage that when they are processed and subsequently cured at <10° C., in particular at <5° C., they become totally brittle and in the extreme case form a crumbly mass without any strength shortly after curing when subjected to temperatures in this range. The advantage of the one-component foam produced using the polyol component of the present invention becomes apparent here. It displays absolutely no brittleness of the type described, thus demonstrating the advantageous properties of the specific mixture of the alkoxylated fatty acid esters, i.e. the modified polyols derived from natural materials. Even in the low temperature range, they give the foam the necessary elasticity while at the same time giving high strength. As indicated above, a further advantage of the foam is its improved flame-retardant action. The synergistic effect given by aromatic structures and ester structures in the polymer in combination with customary halogenated organic phosphate flame retardants results in a high flame-retardant action which, according to known solutions, is only possible by means of high proportions of expensive, reactive flame retardant polyols. This gives a particularly economical way of making the polyurethane-polyurea one-component foam flame retardant in accordance with the requirements of the building material fire class B2 according to DIN 4102.

The following examples illustrate the invention.

EXAMPLE 1

A mixture is prepared from 330 gram of a recycled polyester obtained from polyethylene terephthalate, adipic acid and diethylene glycol and having an OH number of 76 mg KOH/g, 140 gram of an ethoxylated glycerol ester of a dimeric fatty acid having an OH number of 126 mg KOH/g, 77 gram of ethoxylated castor oil having an OH number of 85 mg KOH/g and 330 gram of trichloro-propyl phosphate.

To this mixture are added 15 gram of crosslinker (an alkoxylated trimethylolpropane having an OH number of 875 mg KOH/g), 25 gram of a foam stabilizer, 9 gram of bis(morpholinoethyl) ether as catalyst and 79 gram of 4-methyl-4-hydroxypentan-2-one as monool and the whole is intensively mixed. A uniform homogeneous liquid phase is formed.

300 gram of polyol mixture containing these additives are placed in a 1 l aerosol can. After addition of 380 gram of a polyisocyanate, the aerosol can is closed so as to be gastight by means of a valve. 70 gram of tetrafluoroethane, 45 gram of dimethyl ether, 26 gram of butane and 6 gram of propane are then immediately metered through the valve into the aerosol can. The contents of the can are homogenized by vigorous shaking and the prepolymer synthesis commences. After storage for about 24 hours at 50° C., the prepolymer synthesis is sufficiently complete for the aerosol can to be able to be used. The foam discharged from the aerosol can after opening the valve has the following properties which are shown below in comparison with a previously commercially available one-component foam:

| Property/feature | Foam according to Example 1 | CFC-free Aerosol foam from SOUDAL |
| --- | --- | --- |
| Tensile strength (N/cm$^2$) | 11,8 | 8 |
| Elongation at break (%) | 36 | 23 |
| Shear strength (N/cm$^2$) | 6.2 | 5 |
| Compressive strength (N/cm$^2$) | 6.8 | 5 |

The low viscosity of the prepolymer present in the aerosol can has the indirect result that the aerosol can can be emptied better and the remaining residue is significantly less (20 gram) than in the case of the commercial aerosol cans (about 50–70 gram). The foam can be processed without problems at 5° C. It displays no brittleness whatever in this temperature range.

In addition, it has flame-retardant properties and achieves this without flame-retardant polyols which are usually expensive and difficult to handle.

EXAMPLE 2

A mixture is prepared from 280 gram of a recycled polyester obtained from polyethylene terephthalate, adipic acid and diethylene glycol and having an OH number of 76 mg KOH/g, 118 gram of an ethoxylated glycerol ester of a dimeric fatty acid having an OH number of 110 mg KOH/g, 120 gram of ethoxylated castor oil having an OH number of 78 mg KOH/g, 24 gram of a polyether based on glycerol/ethylene oxide and having an OH number of 240 mg KOH/g and 320 gram of trichloropropyl phosphate.

To this mixture are added 15 gram of crosslinker (an alkoxylated trimethylolpropane having an OH number of 875 mg KOH/g), 25 gram of a foam stabilizer, 9 gram of bis(morpholinoethyl) ether as catalyst and 89 gram of 4-methyl-4-hydroxypentan-2-one as monool and the whole is intensively mixed. A uniform homogeneous liquid phase is formed.

310 gram of polyol mixture containing these additives are placed in a 1 l aerosol can. After addition of 370 gram of a polyisocyanate, the aerosol can is closed so as to be gastight by means of a valve. 70 gram of tetrafluoroethane, 45 gram of dimethyl ether, 26 gram of butane and 6 gram of propane are then immediately metered through the valve into the aerosol can. The contents of the can are homogenized by vigorous shaking and the prepolymer synthesis commences. After storage for about 24 hours at 50° C., the prepolymer synthesis is sufficiently complete for the aerosol can to be able to be used. The foam discharged from the aerosol can after opening the valve has the following properties which are shown below in comparison with a previously commercially available one-component foam:

| Property/feature | Foam according to Example 2 | CFC-free Aerosol foam from SOUDAL |
| --- | --- | --- |
| Tensile strength (N/cm$^2$) | 10.6 | 8 |
| Elongation at break (%) | 38 | 23 |
| Shear strength (N/cm$^2$) | 6.1 | 5 |
| Compressive strength (N/cm$^2$) | 7.2 | 5 |

The low viscosity of the prepolymer present in the aerosol can has the indirect result that the aerosol can can be emptied better and the remaining residue is significantly less (25 gram) than in the case of the commercial aerosol cans (about 50–70 gram). The foam can be processed without problems at 5° C. It displays no brittleness whatever in this temperature range.

In addition, it has flame-retardant properties and achieves this without flame-retardant polyols which are usually expensive and difficult to handle.

EXAMPLE 3

A mixture is prepared from 330 gram of a recycled polyester obtained from polyethylene terephthalate, adipic acid and diethylene glycol and having an OH number of 76 mg KOH/g, 120 gram of an ethoxylated glycerol ester of a dimeric fatty acid having an OH number of 126 mg KOH/g, 42 gram of ethoxylated castor oil having an OH number of 78 mg KOH/g, 60 gram of a polyethylene glycol and having an OH number of 185 mg KOH/g and 330 gram of trichloropropyl phosphate.

To this mixture are added 15 gram of crosslinker (an alkoxylated trimethylolpropane having an OH number of 875 mg KOH/g), 25 gram of a foam stabilizer, 9 gram of bis(morpholinoethyl) ether as catalyst and 69 gram of 4-methyl-4-hydroxypentan-2-one as monool and the whole is intensively mixed. A uniform homogeneous liquid phase is formed.

310 gram of polyol mixture containing these additives are placed in a 1 l aerosol can. After addition of 370 gram of a polyisocyanate, the aerosol can is closed so as to be gastight by means of a valve. 70 gram of tetrafluoroethane, 45 gram of dimethyl ether, 26 gram of butane and 6 gram of propane are then immediately metered through the valve into the aerosol can. The contents of the can are homogenized by vigorous shaking and the prepolymer synthesis commences. After storage for about 24 hours at 50° C., the prepolymer synthesis is sufficiently complete for the aerosol can to be able to be used. The foam discharged from the aerosol can after opening the valve has the following properties which are shown below in comparison with a previously commercially available one-component foam:

| Property/feature | Foam according to Example 3 | CFC-free Aerosol foam from SOUDAL |
|---|---|---|
| Tensile strength (N/cm$^2$) | 11.2 | 8 |
| Elongation at break (%) | 29 | 23 |
| Shear strength (N/cm$^2$) | 6.9 | 5 |
| Compressive strength (N/cm$^2$) | 7.3 | 5 |

The low viscosity of the prepolymer present in the aerosol can has the indirect result that the aerosol can can be emptied better and the remaining residue is significantly less (32 gram) than in the case of the commercial aerosol cans (about 50–70 gram). The foam can be processed without problems at 5° C. It displays no brittleness whatever in this temperature range.

In addition, it has flame-retardant properties and achieves this without flame-retardant polyols which are usually expensive and difficult to handle.

We claim:

1. A phase-stable polyol component comprising
    A1) from 5 to 95 percent by weight, based on A1, of at least one alkoxylated fatty acid ester,
    A2) at least one polyester polyol and
    A3) at least one liquid flame retardant additive,
where the constituents A1:A2:A3 are present in a weight ratio of 10±4.5:13±4:14±4.5.

2. A phase-stable polyol component as claimed in claim 1, wherein the component A1 has a mean molecular weight of at least 500 g/mol.

3. A phase-stable polyol component as claimed in claim 1, wherein the component A2 has a mean molecular weight of at least 500 g/mol.

4. A phase-stable polyol component as claimed in claim 1, wherein the alkoxylated fatty acid ester used is alkoxylated castor oil.

5. A phase-stable polyol component as claimed in claim 1, wherein the alkoxylated fatty acid ester used is alkoxylated castor oil having a mean molecular weight of at least 1,100 g/mol.

6. A phase-stable polyol component as claimed in claim 1, wherein the alkoxylated fatty acid esters are ethoxylated.

7. A phase-stable polyol component as claimed in claim 1, wherein the alkoxylated fatty acid esters used are alkoxylated glycerol-fatty acid esters.

8. A phase-stable polyol component as claimed in claim 1, wherein the alkoxylated fatty acid esters used are alkoxylation products of mixtures of glycerol esters of dimeric fatty acids having contents of monomeric fatty acids and trimeric fatty acids and free glycerol.

9. A phase-stable polyol component as claimed in claim 1, wherein the component A2) has a mean molecular weight of at least 500 g/mol.

10. A phase-stable polyol component as claimed in claim 1, wherein the polyester polyol used is at least one reaction product of at least one dicarboxylic acid, a polyalkylene terephthalate and at least one diol.

11. A phase-stable polyol component as claimed in claim 10, wherein the polyester polyol used comprises reaction products of a dicarboxylic acid, polyethylene terephthalate and/or polybutylene terephthalate and at least one diglycol.

12. A phase-stable polyol component as claimed in claim 10, wherein polyethylene terephthalate and polybutylene terephthalate are used in the form of recycled material.

13. A phase-stable polyol component as claimed in claim 12, wherein the recycled polyethylene terephthalate material is used in the form of powder or granules.

14. A phase-stable polyol component as claimed in claim 11, wherein the recycled polyethylene terephthalate material is used in the form of polyethylene terephthalate fiber waste.

15. A phase-stable polyol component as claimed in claim 1, wherein the liquid flame retardant additive A3 comprises at least one organic alkyl phosphate and/or at least one organic alkyl phosphonate.

16. A phase-stable polyol component as claimed in claim 1, wherein the liquid flame retardant additive A3 comprises at least one halogenated alkyl phosphate and/or at least one halogenated alkyl phosphonate.

* * * * *